(12) United States Patent
Stewart et al.

(10) Patent No.: US 9,962,635 B2
(45) Date of Patent: May 8, 2018

(54) ROTARY DISC FILTER WITH AUTOMATIC INTEGRATED BACKWASH AND CHEMICAL CLEANING SYSTEM

(71) Applicant: Veolia Water Solutions & Technologies Support, Saint-Maurice (FR)

(72) Inventors: Mark H. Stewart, Raleigh, NC (US); Luke Wood, Cary, NC (US); Todd Casey, Apex, NC (US); Ronald V. Palumbo, Cary, NC (US); Rune Strube, Rungsted Kyst (DK)

(73) Assignee: VEOLIA WATER SOLUTIONS & TECHNOLOGIES SUPPORT, Saint-Maurice (FR)

( * ) Notice: Subject to any disclaimer, the term of this patent is extended or adjusted under 35 U.S.C. 154(b) by 452 days.

(21) Appl. No.: 14/775,196

(22) PCT Filed: Mar. 11, 2014

(86) PCT No.: PCT/US2014/023045
§ 371 (c)(1),
(2) Date: Sep. 11, 2015

(87) PCT Pub. No.: WO2014/159327
PCT Pub. Date: Oct. 2, 2014

(65) Prior Publication Data
US 2016/0129377 A1 May 12, 2016

Related U.S. Application Data

(60) Provisional application No. 61/784,062, filed on Mar. 14, 2013.

(51) Int. Cl.
*B01D 33/50* (2006.01)
*B01D 33/80* (2006.01)
*B01D 33/48* (2006.01)

(52) U.S. Cl.
CPC ............. *B01D 33/50* (2013.01); *B01D 33/48* (2013.01); *B01D 33/804* (2013.01); *B01D 2201/084* (2013.01); *B01D 2201/085* (2013.01)

(58) Field of Classification Search
CPC ...... B01D 33/21; B01D 33/50; B01D 33/804; B01D 33/463; B01D 2201/084; B01D 2201/085
See application file for complete search history.

(56) References Cited

U.S. PATENT DOCUMENTS

| 5,213,696 A | 5/1993 | Patrone et al. |
| 5,423,977 A | 6/1995 | Aoki et al. |
| 2010/0032388 A1 | 2/2010 | Ralvert |

FOREIGN PATENT DOCUMENTS

| CN | 102078722 A | 6/2011 |
| CN | 102430276 A | 5/2012 |

(Continued)

OTHER PUBLICATIONS

CN Search Report dated Mar. 28, 2016 in re CN Application No. 201480014918.X filed Sep. 14, 2015.

*Primary Examiner* — Terry K Cecil
(74) *Attorney, Agent, or Firm* — Coats & Bennett, PLLC

(57) ABSTRACT

A rotary disc filter is provided with an integrated backwash and chemical cleaning system. In one mode of operation, backwash is directed through a control valve to one or more nozzles for spraying the backwash onto the filter media forming a part of a rotary disc filter. In a second mode, a chemical cleaning mode, the pump directs backwash through an eductor that induces a chemical into the inductor which is mixed with the backwash to form a backwash-chemical mixture that is sprayed onto the filter media. A control system is used in conjunction with the backwash and cleaning systems to monitor process information and/or filter media properties and to determine when to perform (Continued)

backwashes and regenerative cleanings in order to optimize the performance of the filter system.

20 Claims, 6 Drawing Sheets

(56) References Cited

FOREIGN PATENT DOCUMENTS

| | | |
|---|---|---|
| DE | 3826206 A1 | 2/1990 |
| JP | H07241413 A | 9/1995 |
| KR | 100263006 B1 | 8/2000 |
| KR | 200361846 B1 | 9/2004 |

US 9,962,635 B2

ROTARY DISC FILTER WITH AUTOMATIC INTEGRATED BACKWASH AND CHEMICAL CLEANING SYSTEM

This application is a U.S. National Stage Application of PCT Application No. PCT/US2014/023045, with an international filing date of 11 Mar. 2014. Applicant claims priority based on U.S. Provisional Patent Application No. 61/784062 filed 14 Mar. 2013. The subject matter of these applications is incorporated herein.

FIELD OF THE INVENTION

The present invention relates to rotary disc filters and more particularly to a rotary disc filter having a system for automatically controlling both backwash and chemical cleaning of the filter media forming a part of the rotary disc filter.

BACKGROUND OF THE INVENTION

Rotary disc filters utilize backwashing systems to periodically clean the filter media disposed on opposite sides of rotating disc-shaped filter members. Generally, when backwashing is needed, the rotary drum supporting the disc-shaped filter members is rotated. The backwashing system sprays a backwash at a pressure of approximately 100 psi, for example, onto the exterior surface of the filter media. This causes suspended solids secured on the inside of the filter media to be dislodged and fall into a collection trough inside the drum of the disc filter. While standard pressurized backwash is adequate in many cases to keep the filter media clean and maintain the hydraulic capacity under most conditions, experience has shown that certain process conditions will result in a fouling effect on the filter media that is not removed by standard backwash. This fouling effect may occur as a result of biological growth, mineral precipitation, build-up of chemical residue (such as polymer), or other various process conditions that may result in fats, oils, greases, etc. coming into contact with the filter media. When this occurs, the hydraulic capacity of the filter media is significantly reduced as a result of the fouling.

When there is significant fouling of the filter media, there is a need for chemical cleaning which is sometimes referred to as filter media regeneration. While chemical cleaning is known, one of the drawbacks of conventional rotary disc filters today is that cleaning by conventional backwash approaches and regenerative cleaning, such as by utilizing chemicals, are generally disconnected and are not integrated and controlled in relationship to each other. This often leads to inefficient backwashing and chemical cleaning regimes.

Moreover, when it comes to regenerative cleaning, it is often difficult to determine the appropriate time when regenerative cleaning is needed or required and also it is difficult to determine how to implement regenerative cleaning in a way that does not substantially impact the ongoing performance of the rotary disc filter. In the past, regenerative cleaning has been employed when the disc filter is off-line, or not in use. This is costly and expensive. Therefore, there has been and continues to be a need for an integrated backwash and regenerative cleaning system that is automatically controlled and wherein regenerative cleaning can be carried out in a way that does not substantially detract from the capacity of the rotary disc filter.

SUMMARY OF THE INVENTION

The present invention relates to a rotary disc filter having an integrated automatic backwash and cleaning system. In one embodiment, the rotary disc filter includes a rotary drum, a drive for rotatively driving the rotary drum, one or more disc-shaped filter members secured about the drum and extending outwardly therefrom with each disc-shaped filter member including filter media disposed on each side thereof. In one embodiment, the rotary disc filter includes an integrated backwash and chemical cleaning system that is operative in a backwash mode to direct the backwash onto the filter media and operative in a chemical cleaning mode to mix the backwash with a chemical to form a backwash-chemical mixture and direct the backwash-chemical mixture onto the filter media. In one particular embodiment for the integrative backwash and chemical cleaning system, there is provided an eductor that is operative to receive the backwash as a motive fluid. Backwash directed under pressure into the eductor causes the eductor to induce a chemical from a chemical source and to mix the chemical with the backwash passing through the eductor to form a backwash-chemical mixture. This backwash-chemical mixture is directed to one or more spray nozzles that spray the backwash-chemical mixture onto the filter media. Use of the eductor allows the same pump to be used for the standard backwash as well as the chemical cleaning, compared to typical systems today which use a separate pump for each type of cleaning.

The present invention also entails a rotary disc filter having a control system for controlling regenerative or chemical cleaning of the filter media. In one exemplary embodiment, the rotary disc filter is provided with a controller for determining when to perform filter media regenerative cleaning based on current process information and historical or model process information. In one example, the controller evaluates current process information, compares the current process information with historical or model process information and activates the chemical or regenerative cleaning process for cleaning the filter media when the comparison of the current process information with the historical or model process information indicates that regenerative cleaning would be useful to maintain a selected filtering efficiency.

Other objects and advantages of the present invention will become apparent and obvious from a study of the following description and the accompanying drawings which are merely illustrative of such invention.

DESCRIPTION OF PREFERRED EMBODIMENT

The present invention relates to rotary filters and, as discussed above, is directed to a rotary disc filter or drum filter having an integrated automatic backwash and chemical cleaning system. From time to time, the disclosure herein will refer to a rotary disc filter and at other times the disclosure will refer to a drum filter. It is understood and appreciated that the integrated automatic backwash and chemical cleaning system discussed herein can be applied to either.

As discussed below, the integrated automatic backwash and chemical cleaning system is operative in one mode to direct a backwash onto filter media that forms a part of the rotary disc filter and, in another mode, is operative to direct a backwash-chemical mixture onto the filter media. The rotary disc filter is provided with a system and process for automatically controlling chemical or regenerative cleaning based on current process conditions or information and historical or model process information. The system and process is operative to evaluate current process information and compare it with historical or model process information and determine if it is appropriate to institute chemical or regenerative cleaning and, if appropriate, the system and process determines the optimum time in which to do so without substantially impacting the filtering capacity of the rotary disc filter.

Before discussing these control systems, it is beneficial to briefly review generally rotary disc filters, their basic construction, and how they are used to filter water or wastewater. Rotary disc filters are well known and widely used to provide water filtration. As used herein, the term 'water' encompasses all forms of feedwater, to include wastewater. Rotary disc filters are shown and described in patents and other published materials. For example, reference is made to U.S. Pat. No. 7,597,805 and U.S. Patent Publication No. 2008/0035584. The disclosures of these two publications are expressly incorporated herein by reference. A complete and unified understanding of disc filters, their structure, and operation can be gained by reviewing these materials.

Figure 1:
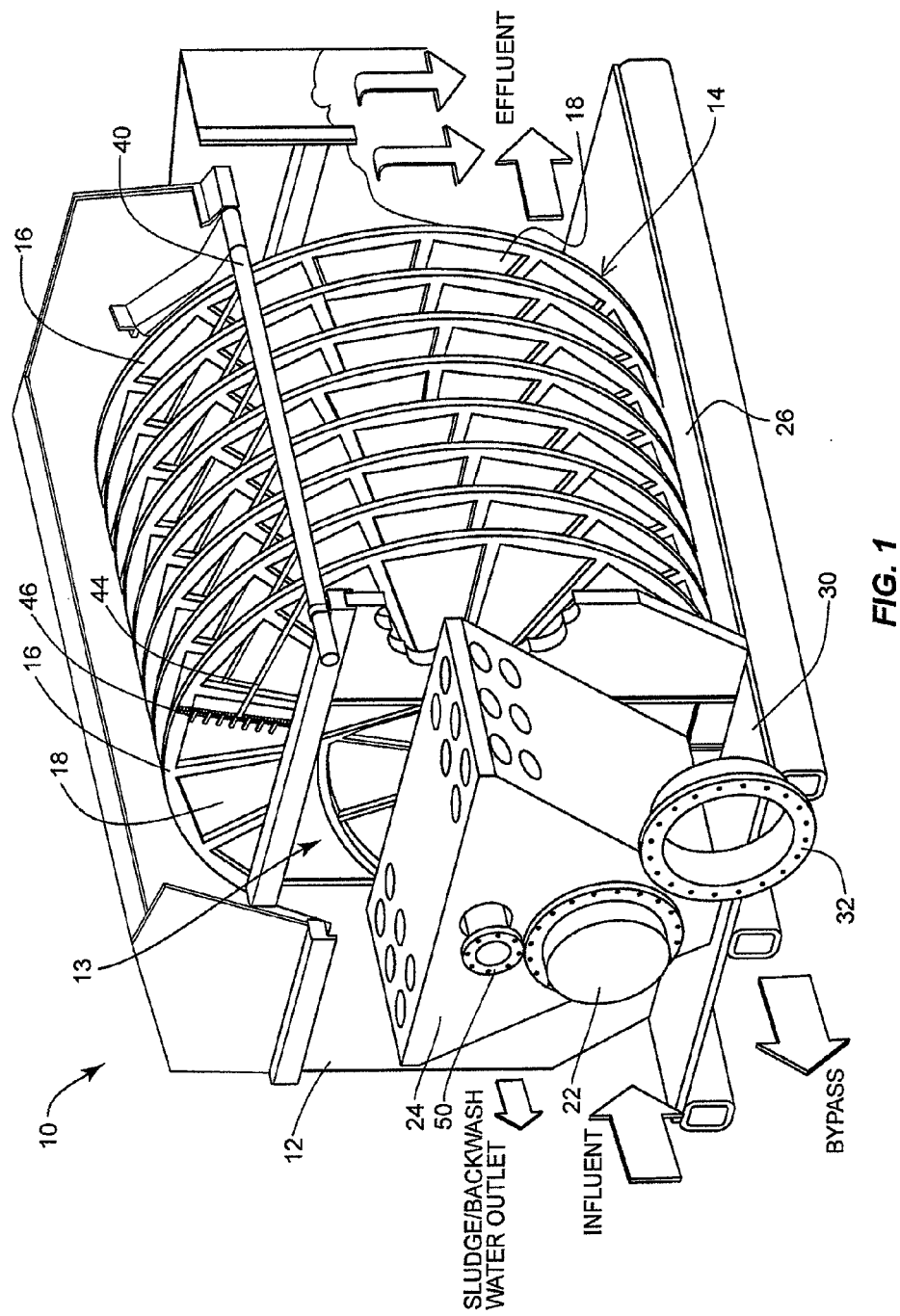
FIG. 1 is a perspective view of an exemplary disc filter with portions of the structure broken away to better illustrate basic components of the disc filter.

FIG. 1 shows a disc filter indicated generally by the numeral 10. Disc filter 10 includes an outer housing 12 or an open frame structure for installation in channels. Rotatively mounted in the housing 12 is a drum 13. Generally, the drum 13 is enclosed, except that it includes an inlet opening and, in one embodiment, a series of openings formed in the surface thereof for enabling influent to flow from the drum 13 into a series of rotary filter disc, indicated generally by the numeral 14, mounted on the drum 13. That is, as will be appreciated from subsequent discussions herein, in one embodiment, influent is directed into the drum 13, and from the drum 13 through openings in the surface thereof into the respective rotary filter discs 14.

The number of rotary filter discs 14 secured on the drum 13 and rotatable therewith can vary. Basically, each rotary filter disc 14 includes a filter frame 16 and filter media 18 secured on opposite sides of each rotary filter disc 14. A holding area is defined inside each rotary filter disc 14 for receiving influent to be filtered by the rotary filter disc 14. It should be noted that the rotary disc filter 10 shown herein is of the inside-out type, which means that the water to be filtered enters the drum 13 and flows from the drum 13 into the disc-shaped filter members, and from there outwardly through the filter media. The integrated automatic backwash and chemical cleaning system of the present invention can be employed in an outside-in rotary filter. In that case, the water to be filtered enters the disc-shaped filter members through the filter media and the filtered effluent is directed from the rotary disc filter.

Figure 1A:
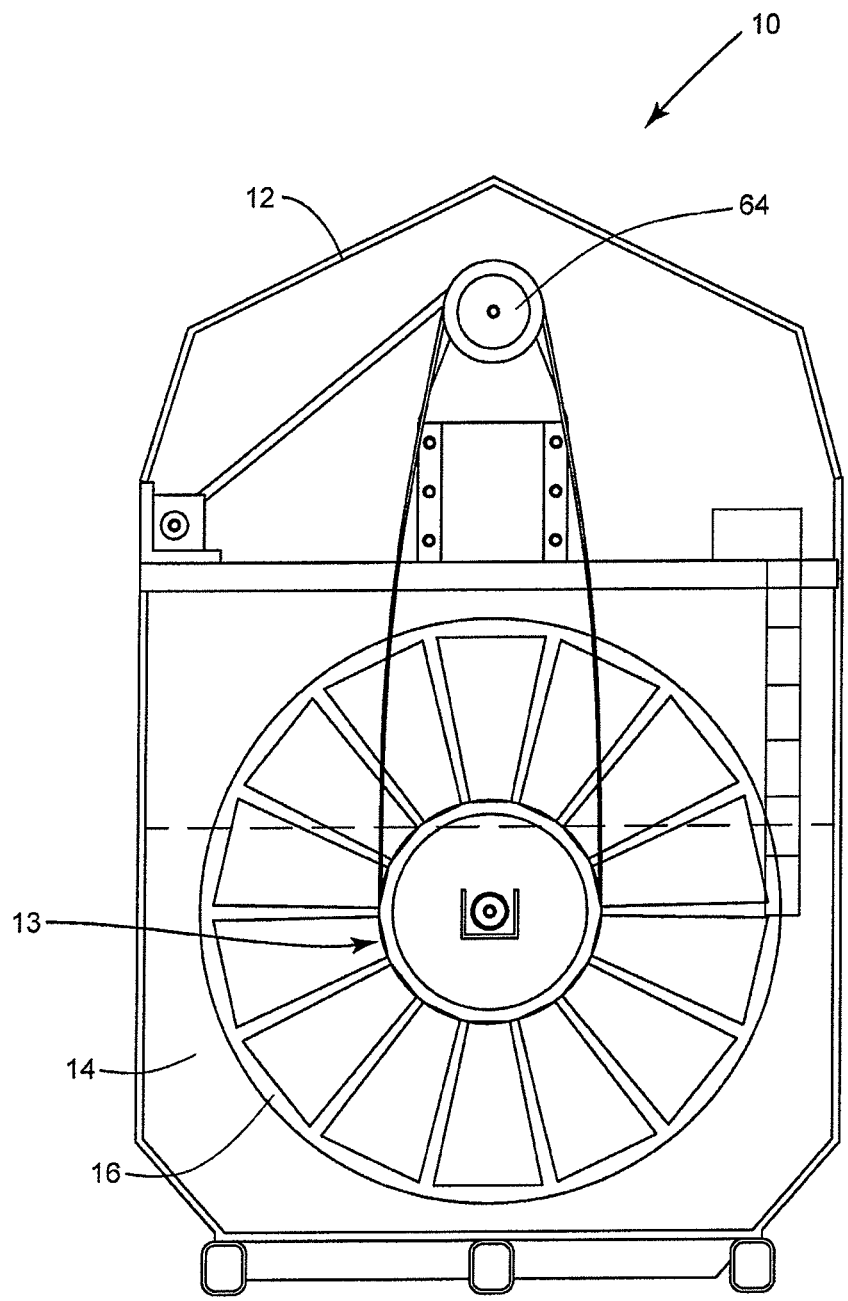
FIG. 1A is a schematic illustration of an end view of the disc filter showing the backwash pump and the drive system for driving the drum and filter disc.

Disc filter 10 is provided with a drive system for rotatively driving the drum 13 and the rotary filter discs 14 mounted thereon. There is provided a drum motor 64 that is operative to drive a sprocket or sheave (not shown) connected to the drum 13. See FIG. 1A. Various means can be operatively interconnected between the drum motor 64 and the sprocket for driving the sprocket, and hence the drum 13. For example, a belt drive can be utilized. Various other types of drive systems can be utilized to rotate the drum 13 and the rotary filter discs 14 mounted thereon.

Continuing to refer to FIG. 1, the disc filter 10 includes an influent inlet 22. Influent inlet 22 leads to an influent holding tank 24. Influent holding tank 24 is disposed adjacent an inlet opening formed in the drum 13 such that influent held within the influent holding tank 24 can flow from the holding tank into the drum 13. As seen in the drawings, the influent holding tank is disposed on the upstream side of the disc filter 10. Disposed around and generally below the influent holding tank 24 is a bypass tank 30. An outlet 32 enables influent to flow from the bypass tank 30. Note that the influent holding tank 24 includes overflow openings. These overflow openings permit influent overflow to flow from the influent holding tank 24 downwardly into the bypass tank 30. This effectively limits the water level height in the influent holding tank 24.

Disc filter 10 also includes an effluent holding tank 26. Effluent holding tank 26 is disposed about a downstream end portion of the disc filter 10, and as shown in the drawings, extends around at least a lower portion of the rotary filter discs 14. As the influent moves outwardly through the filter media 18, this results in the water being filtered, and it follows that the filtered water constitutes an effluent. It is this effluent that is held within the effluent holding tank 26. There is also provided an effluent outlet associated with the effluent holding tank 26 for directing effluent or filtered water from the disc filter 10.

Therefore, it follows that influent water to be treated or filtered is directed into the influent inlet 22 and into the influent holding tank 24 where the water accumulates to a selected height therein so as to provide a head pressure for effectively causing the water to move from the inner portions of the rotary filter discs 14 outwardly through the filter media 18. Influent held within the holding tank 24 eventually is directed into the drum 13, and from the drum 13 through openings therein into the interior areas of the rotary filter discs 14. Now, the water within the rotary filter disc moves outwardly through the filter media 18 into the effluent holding tank 26, and eventually out the effluent outlet.

Figure 2:
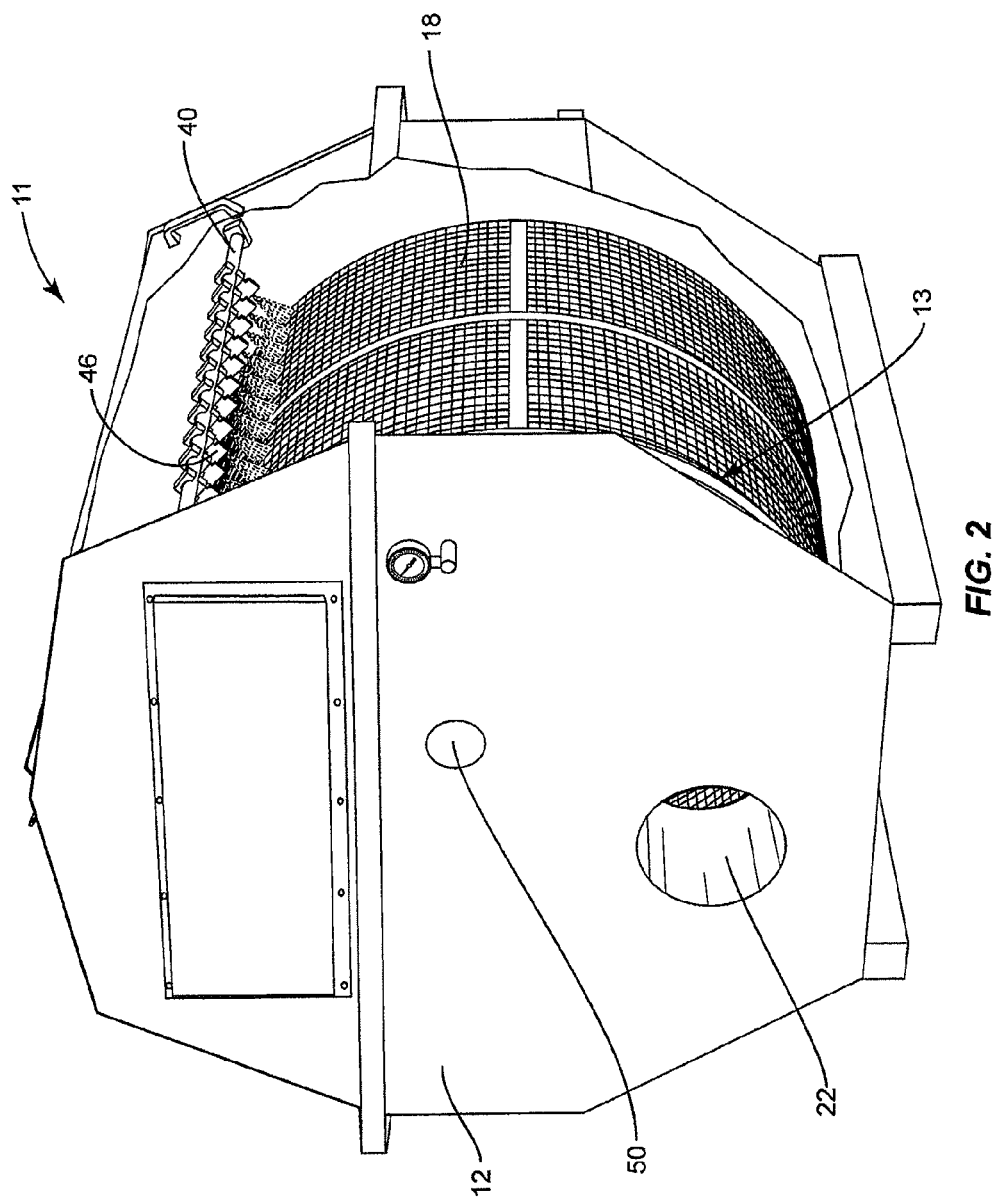
FIG. 2 is a perspective view of a drum filter.
Figure 3:
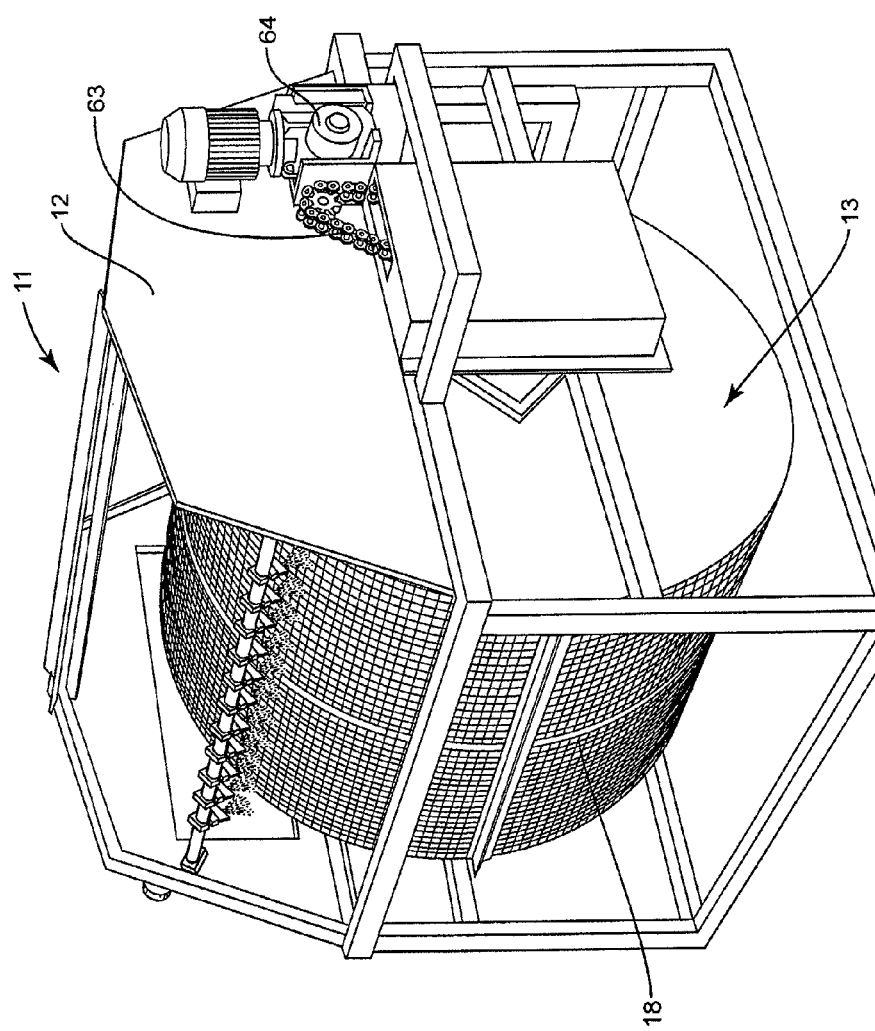
FIG. 3 is another perspective view of the drum filter shown in FIG. 2.

The above discussion focuses on the disc filter 10. There is another water filtering apparatus that is very similar in many respects to the disc filter 10 discussed above. It is referred to as a drum filter. Shown in FIGS. 2 and 3 is a drum filter that is indicated generally by the numeral 11. Details of the drum filter are not discussed herein because drum filters are known in the art and are commercially available. For example, Hydrotech Veolia Water Systems Aktiebolag of Mejselgatan 6, 235 32 Vellinge, Sweden manufactures and sells a drum filter. The drum filter 11 differs from the disc filter 10 discussed above in that the filter media 18 is placed on the drum 13 of the drum filter 11 while in the case of the disc filter 10 the filter media 18 is placed on opposite sides of the filter discs 14.

With particular reference to FIGS. 2 and 3 the drum filter 11 is shown therein and includes a housing 12. Drum 13 is rotatively mounted in the housing 12. An inlet 22 directs water to be filtered into the drum 13. As discussed above, the drum 13 includes panels of filter media 18 secured around the drum. See FIGS. 2 and 3. Like the disc filter 10, the drum filter 11 includes a backwashing system and an outlet 50 for directing sludge or solids from the drum filter 11 due to cleaning by backwashing. Note the backwashing system shown in FIGS. 2 and 3. The backwashing system includes a manifold or header 40 that extends parallel to the longitudinal axis of the drum 13 and is spaced just outwardly of the filter media 18. Operatively connected to the manifold 40 is a series of nozzles 46. The manifold or header is connected to the backwashing pump. Thus, when the filter media 18 is backwashed the backwashing pump directs water or a cleaning solution through the manifold 40 and out the spray nozzles 46. This causes solids on the inner sides of the filter media 18 to be dislodged and to fall into a capture area after which the solids or the sludge is channeled from the drum filter 11 and out the sludge outlet 50.

Drum filter 11 includes a drive system for rotating the drum 13. This is particularly shown in FIG. 3. The drive system includes a motor 64 that is driveably connected to the drum 13 by a chain drive 63. Actuation of the motor 64 causes the chain drive 63 to drive and rotate the drum 13.

Therefore, in similar fashion to the process discussed with respect to the disc filter 10, water to be filtered is directed into the inlet 22 of the drum filter 11. Water directed into the inlet 22 eventually is discharged into the interior of the drum 13. Once in the drum the water is filtered as it flows outwardly through the wall structure of the drum 13 and through the filter media secured to the drum. That is, water exiting past the filter media 18 becomes the filtered effluent and is collected in a chamber or collection basin that surrounds the lower portion of the drum 13. Thereafter, the filtered effluent is directed from the drum filter 11 and in some cases is directed to downstream treatment stations where further treatment is carried out with respect to the effluent.

Figure 4:
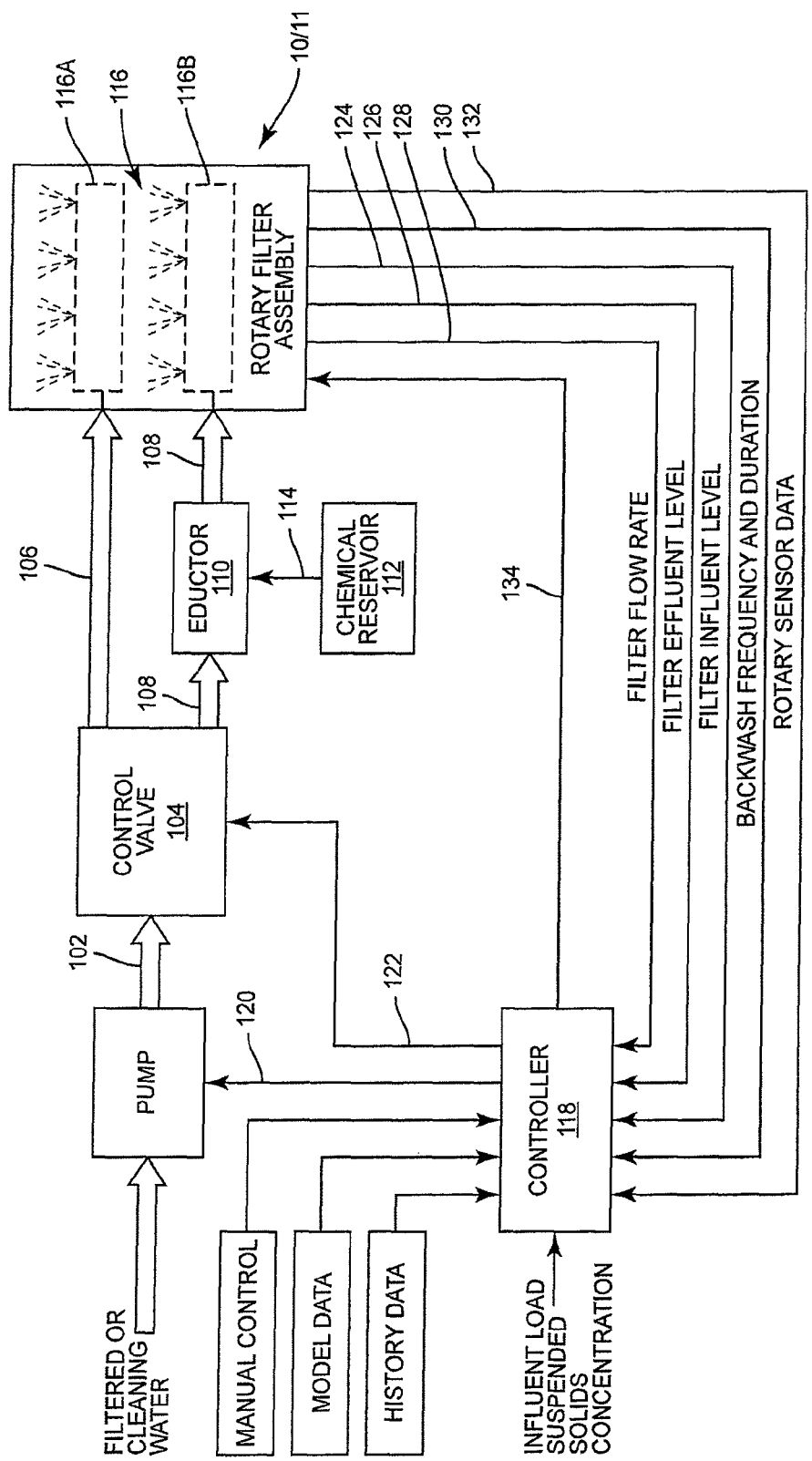
FIG. 4 is a schematic illustration illustrating the integrated automatic backwash and chemical cleaning system of the present invention.

Turning to FIG. 4, there is shown therein the integrated automatic backwash and chemical cleaning system discussed above. This system comprises a backwash pump which is operative to pump a backwash such as filtered water or cleaning water from a source via line 102 to a control valve 104. Control valve 104 can take on various forms, but in one embodiment it includes a three-way ball valve. On the outlet side of the control valve 104, the control valve is connected to a backwash supply line 106 and a chemical supply line 108. Backwash supply line 106 leads to a spray nozzle assembly, indicated generally by the numeral 116. More particularly, the spray nozzle assembly 116 includes a backwash set of nozzles 116A and a chemical cleaning set of nozzles 116B. In some embodiments, the spray nozzles used for backwashing can also be used for chemical cleaning. In the embodiment illustrated in FIG. 4, the backwash supply line 106 is operatively connected to the set of backwash spray nozzles 116A.

Returning to the chemical supply line 108, it is seen in FIG. 4 that an eductor 110 is operatively connected in this line. Eductor 110 is a conventional Venturi device that is designed to utilize a motive fluid to induce a secondary fluid into the motive fluid where the secondary fluid is mixed with the motive fluid. In this case, the eductor 110 is operatively connected to a chemical reservoir 112 that holds a chemical used to clean the filter media. A feed line 114 extends from the chemical reservoir 112 to the eductor. As will be appreciated from subsequent portions of the disclosure, the control valve 104, in a chemical cleaning mode, directs backwash from the control valve 104 through chemical supply line 108 into and through the eductor 110. The backwash serves as the motive fluid and induces a chemical from the chemical reservoir into the eductor where the chemical is mixed with the backwash to form the backwash-chemical mixture. This backwash-chemical mixture is directed to the chemical cleaning set of nozzles 116B.

The integrated automatic backwash and chemical cleaning system depicted in FIG. 4 comprises a controller or controller circuit 118 for controlling the pump and the control valve 104. It is appreciated that controller 118 could also control other components of the rotary disc filter or drum filter, such as, for example, the rotation of the discs or drum, and their rotation speed. In any event, controller 118 is operatively connected to the pump and control valve 104 via signal lines 120 and 122. In addition, there is provided numerous inputs to controller 118 and these inputs are utilized to control the mode of cleaning, that is backwash cleaning mode or chemical cleaning mode, as well as the "on" or "off" state of the pump. Pump, in some embodiments, is a variable speed pump and controller 118 controls the speed of that pump.

As shown in FIG. 4 there are five data input lines 124, 126, 128, 130, and 132 that are provided to the controller 118. Various information can be sensed or collected by sensors associated with a rotary filter to represent current operating conditions or current process information. In the exemplary embodiment of FIG. 4, it is seen that the filter flow rate is inputted into the controller 118 as well as the filter effluent and influent levels. It follows that the difference between the influent and effluent levels is a representation of the operating head. In addition, information representative of the influent load is directed into the controller 118. Information relating to influent load can entail various parameters such as influent flow rate, concentration of suspended solids or turbidity in the influent and other information that relates to the degree that the influent loads the rotary filter. Information relating to the duration and frequency of the backwash process can also be an indicator of the media porosity when compared to the other process conditions such as flow rate and/or solids loading rates. As an example, as the media becomes more fouled, the backwash durations and frequencies would increase for a given flow and/or solids loading rate.

In addition, the controller 118, as shown in FIG. 4, can be manually controlled. Finally, historical process information and/or model process information can be inputted into the controller. The historical information is gathered and appropriately assimilated for use. The model information may be characterized as expected process information. That is, model process information can be inputted into the controller and is representative of an appropriate or optimal performance by the rotary filter under various process conditions. As will be explained later, this information is helpful in determining when to employ chemical or regenerative cleaning and at what time or times it should be employed in order to avoid adversely impacting from the capacity of the filter.

The control system shown in FIG. 4 is programmed to first utilize conventional backwash cleaning in cases where backwash cleaning will result in an acceptable performance level for the rotary filter. Because backwashing operations are not continuous, the controller, in one embodiment, will automatically determine when backwashing should be initiated. This can be based on any one of a number of process variables, including, but not limited to, influent load, influent level, effluent level, filter flow rate, backwash frequency and/or duration. Historical data or model process information can be utilized to trigger the backwashing event. When the backwashing event is triggered, cleaning water is directed into pump which directs the cleaning water under pressure, typically about 100 psi, to control valve 104.

Controller 118 positions the control valve such that the cleaning water passes through the control valve into the backwash supply line 106 and to the backwash spray nozzles 116A. Controller 118 controls the duration of the backwash. It should be noted that the spray nozzles are generally positioned about an upper portion of the rotary filter adjacent the filter media. During backwashing, only a limited amount of surface area of the filter media is contacted by the spray at any instant. Controller 118 rotates the filter continually while the backwash pump is operating until the entire surface area of the previously submerged filter media has been cleaned. In some cases, the influent loading will require the filter to rotate and the pump to spray for an extended period of time (requiring a number of revolutions) in order to maintain the filter capacity. Controller 118 will control the duration of the backwash (drum rotation in conjunction with pump spray) in order to maximize capacity and prevent overflow.

As discussed above, there are times when backwashing will not sufficiently clean the filter media and, unless cleaned, the performance of the rotary disc filter falls below an acceptable performance level. This is when a second mode of cleaning such as chemical or regenerative cleaning is called for. Controller 118 determines when backwashing alone is no longer sufficient to maintain an acceptable performance level for the rotary disc filter. When this occurs, the controller 118 causes the chemical cleaning or regenerative cleaning to be initiated. In the embodiment shown in FIG. 4, controller 118 actuates control valve 104 and pump. Control valve 104 is positioned such that the backwash directed from the pump is directed through the control valve 104 into the backwash supply line 108. The backwash, under pressure, is directed through the eductor 110. The eductor induces a chemical to flow from the chemical reservoir 112, via feed line 114, into the eductor. The eductor effectively mixes the chemical with the backwash to form the backwash-chemical mixture. Pump is operative to drive or force the backwash-chemical mixture through the chemical supply line 108 into the set of chemical cleaning nozzles 116B. Controller 118 rotates the filter incrementally to spray a small section of filter media then stops the drum rotation and backwash pump temporarily before that section is immersed to provide a predetermined time for the cleaning solution to contact the media. The time permitted for chemically cleaning an area of the filter media can vary. In one example, after spraying the chemical onto the filter media, approximately 2-3 minutes is allowed before that area of the filter media is rotated and submerged. Also as will be discussed subsequently, in certain situations, the controller may interrupt a chemical or regenerative cleaning by switching to backwashing the filter media. In this case, when the backwashing operation is completed, the controller switches back to the chemical cleaning mode where chemical cleaning is continued. The procedure is repeated in sequence until the entire surface of the media has been cleaned with the chemical cleaning solution. The method offers the benefit of minimizing the net consumption of cleaning solution and minimizing impact of the cleaning solution on the filtered flow stream.

There are various possible triggers for informing the controller 118 that regenerative cleaning is necessary or appropriate. In one embodiment, one or more current process variables can be sensed and when one or more are found to be outside a selected range, then that occurrence alone can trigger a chemical or regenerative cleaning process. Again, various process variables such as influent load, influent level, effluent level, flow rate through the filter, backwash frequency or changes in filter media properties can be used as a triggering event for regenerative cleaning.

In one embodiment, the controller is programmed to evaluate one or more current process conditions and to compare those conditions with historical process information or model process information and, based on that comparison, determine if a regenerative cleaning event should occur. Various algorithms and protocols can be employed to establish triggering events. Historical data can be called upon to inform the controller 118 when to trigger a regenerative cleaning process. By considering historical data under similar loading and other process conditions being presently encountered by the rotary filter, the controller 118 can compare present conditions and performance against historical data and performance. Information associated with the historical data informs the controller 118 when regenerative cleaning is required and when regenerative cleaning would restore the performance level of the rotary filter to a threshold or acceptable level that has been set.

The same process can be carried out with respect to model processes. Model processes can be inputted into the controller 118 in such a way that present or ongoing process conditions can be compared with model processes, or expected or optimum processes, so as to inform the controller 118 when a regenerative cleaning process should be triggered. The model process data would indicate a wide range of process conditions that are typically experienced by rotary disc or drum filters. This same information would identify certain process conditions that yield substandard performance and the need for regenerative or chemical cleaning. At the same time, the model process information could provide an instruction on the amount or degree of regenerative cleaning necessary in terms of duration of chemical cleaning.

One of the problems with regenerative cleaning in conventional rotary disc filters is that often the entire rotary disc filter has to be taken offline for a substantial amount of time to accommodate chemical cleaning. This is costly, expensive and presents difficult challenges for operators. The controller 118 is programmed not only to determine when regenerative cleaning is called for, but is also programmed to carry out regenerative cleaning in a manner that does not seriously impact the performance and capacity of the rotary disc filter. That is, controller 118 is designed to institute chemical cleaning even while the rotary disc filter is filtering influent water. For example, if the controller 118 determines that the current process condition warrants a chemical cleaning cycle, then the controller will initiate and perform the chemical cleaning in such a way as to maximize the capacity of the rotary filter while the cleaning activity is performed. As an example, if the cleaning cycle is in process and the current conditions require a standard backwash in order to maintain filtering capacity, the controller would: (1) recognize what portions of the filter media have been cleaned thus far; (2) suspend the chemical cleaning activity while the standard backwash is performed; and (3) resume the chemical cleaning activity for unclean portions of the filter media once the standard backwash cycle is complete. Alternatively, the controller 118 may schedule the chemical cleaning at a time when the influent flow and/or loading would allow for enough time to conduct the chemical cleaning without the need for interruption by a required backwash.

Figure 5:
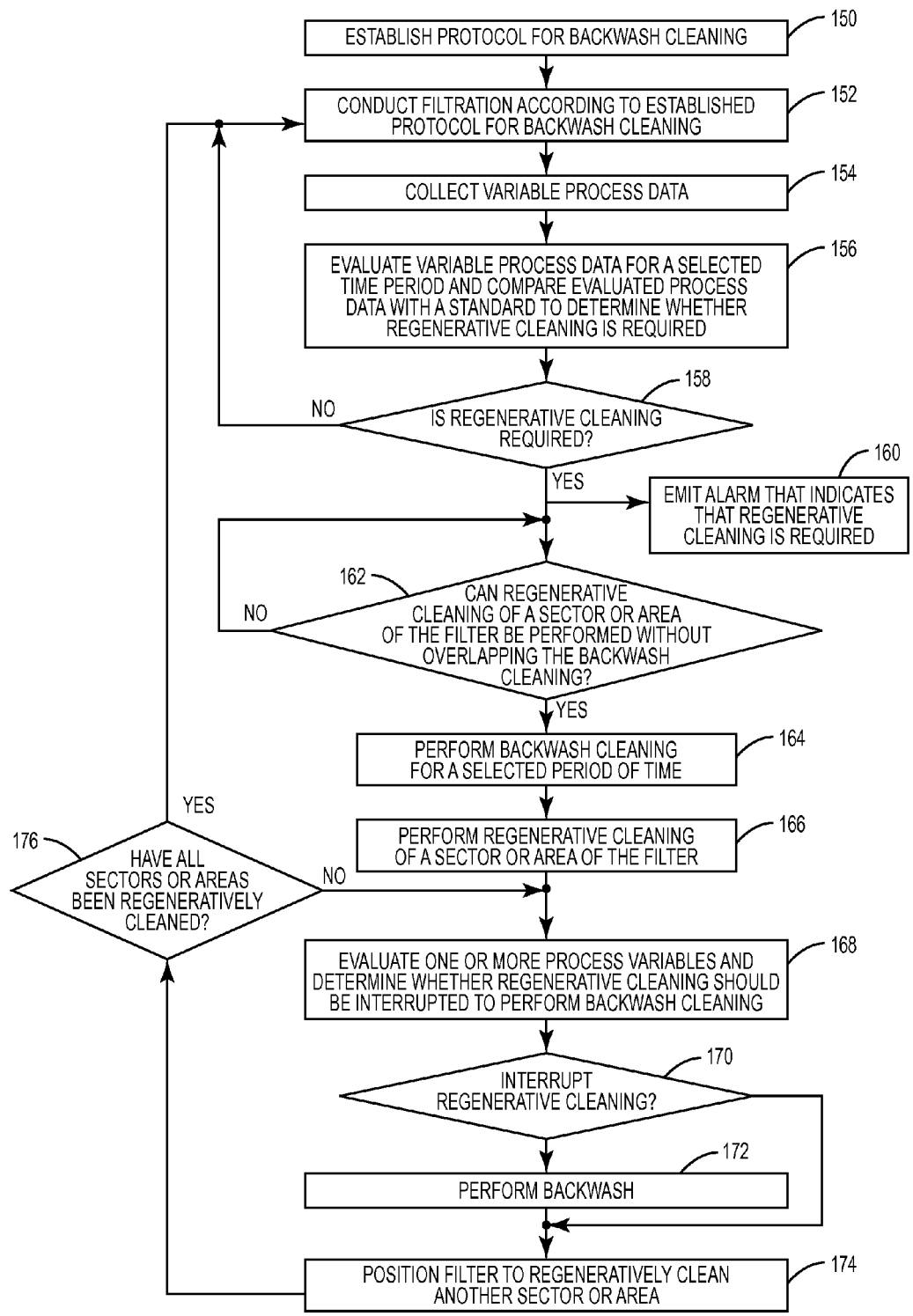
FIG. 5 shows an exemplary logic control diagram for the integrated backwash and chemical cleaning system.

FIG. 5 is a logic control diagram showing one example how the control system, shown in FIG. 4 controls the filter media cleaning system. In the above discussion and in the logic control diagram of FIG. 5, the cleaning system operates in first and second modes. In the examples discussed above and referred to in FIG. 5, the first mode is a backwash cleaning mode and the second mode is a chemical or regenerative cleaning mode. These are only examples. The particular form of the filter media cleaning in first and second modes can vary and do not have to be a backwashing mode and a chemical cleaning mode. For example, the first mode may include backwashing the filter media at one pressure and the second mode may include backwashing the filter media at a higher pressure. There are numerous approaches to cleaning the filter media and they can vary in duration, cleaning solution, intensity, etc.

Turning to the exemplary logic control diagram of FIG. 5, block 150 calls for establishing a protocol for the first mode cleaning which, in this example, is a backwash cleaning. Controller 118 is programmed to execute backwash cleaning of the filter media according to a selected control strategy which can vary. In some cases, the programmed protocol or control strategy will be based on process variables such as influent level, effluent level, flow rate through filter media, influent loading which is in turn based on flow rate of the influent and the suspended solids concentration in the influent, and other process variables. In addition, the protocol or control strategy for the first mode of cleaning may be based on set times or can be based in some part on time between previous backwash cycles.

The control logic begins by conducting filtration according to established protocol for the first mode of cleaning (block 152). In this example, controller 118 controls the cleaning system such that, from time-to-time, backwash cleaning occurs according to the programmed protocol or control strategy. During this time, the control system continues to collect variable process data (block 154). That is, data such as influent flow rate, filter flow rate, influent level, effluent level, suspended solids concentration in the influent, etc. is collected and stored in the control system.

On an ongoing basis, the control system evaluates this variable process data to determine if the second mode of cleaning is appropriate or required (block 156). To implement this control strategy, the controller compares the evaluated variable process data received over a selected period of time with what is referred to as model process information. The model process information can be information relating to historical performance of the rotary filter under various conditions. Alternatively, the model process information may include an empirical-based and/or scientific-based model for a wide variety of process conditions that informs the controller as to appropriate cleaning procedures to institute under certain conditions. In one example, the control strategy for determining whether the second mode of cleaning is appropriate focuses on the solids loading data (flow rate times total suspended solids concentration) and backwash runtime data. Controller 118 evaluates the average solids loading for a particular time period, for example, the last 60 minutes. Further, the controller determines the total backwash runtime for the same period. This variable process information is compared to a model. As noted above, the model can be based on historic information, other empirically derived information, or calculated information. In this example, the controller is provided with model process information that sets forth various solids loadings and for each an optimal or desired backwash runtime that yields optimal porosity of the filter media. Controller 118 consults the model process information and compares the actual backwash runtime with the model backwash runtime for the same or generally the same solids loading. In this example, a ratio of actual runtime to model runtime is determined. If the ratio is within a certain range, then the controller continues to follow the backwashing cleaning protocol. However, if the ratio, in this example, is outside of an acceptable range, then this means that a second cleaning mode is called for and, in the case of this example, this means that chemical or regenerative cleaning is in order. See block 158. Expressed in a different way, the model process information in one example will provide a range of backwash runtimes for a certain solids loading. This means that if, for a certain solids loading, the actual backwash runtime falls within an acceptable range, as prescribed by the model process information, that the controller is programmed to continue operating the cleaning system in the first mode, the backwash cleaning mode. However, for a particular solids loading being experienced by the rotary filter, if the actual backwash runtime is outside of the acceptable range, as prescribed by the model process information, that is an indication that the backwash cleaning mode is no longer effective to yield the filter porosity that is desired and that the cleaning mode is to be changed from the first mode to a second mode which in this example is a chemical cleaning mode. This can actuate an alarm such as a flashing light on or associated with the rotary filter (block 160).

In one embodiment, it may be desired to not automatically proceed with a second mode of cleaning without first determining if the second mode cleaning will overlap or somehow interfere with the first mode backwash cleaning (block 162). Controller 118 can consult information relating to the frequency of backwash cleaning over a selected period of time and the duration of each backwash cleaning cycle. This information can inform the controller 118 whether the second mode of cleaning can proceed without interfering with backwash cleaning. Thus, in some cases, if this option is employed, the second mode of cleaning is suspended until it can be implemented without overlapping or interfering with the backwash cleaning operation.

Once the second mode of cleaning is instituted by the controller 118, in one embodiment as an option, before the second mode of cleaning is started, the controller 118 performs a backwashing cleaning for a selected period of time (block 164). Then the controller actuates the cleaning system and causes the cleaning system to operate in the second mode which, in this example, means that a chemical is sprayed onto the filter media (block 166). In the case of chemical cleaning, only a sector or area of the filter media is cleaned at one time. A typical chemical cleaning operation may have a duration of 2-3 minutes, for example. This is because after the chemical spray is applied to the filter media, the filter media should stand and not be submerged into the underlying water for a period of time.

After the first sector or area has been subjected to the second mode of cleaning, the controller will, in this example, evaluate one or more process variables to determine if the second mode of cleaning should be interrupted in favor of interposing a backwash cleaning cycle. For example, the controller 118 receives influent level information and if this indicates that the influent level is above a threshold height, in this example, the chemical cleaning process is interrupted and the controller causes the cleaning system to perform a backwashing operation. See blocks 168, 170 and 172. If a backwashing cleaning cycle is not called for, then the rotary discs or drum filter are rotated a selected amount and chemical cleaning proceeds with another sector or area. See block 174. This continues until all of the sectors or areas have been subjected to chemical or regenerative cleaning (block 176).

Again, this is one example of a logical control system that automatically controls two different modes of cleaning so as to maintain the porosity of the filter media on the disc filters or drum filter at an optimum or near optimum porosity.

As the foregoing teaches, the present invention relates to a rotary filter that includes an integrated automatic backwash and chemical cleaning system that integrates backwashing and chemical cleaning in a manner that greatly improves the overall filtering efficiency of the rotary disc filter. At the same time, the system and process described herein provides an automatic control system for determining when chemical or regenerative cleaning is called for and also determines the most effective or efficient time or times for employing chemical cleaning without adversely impacting the performance and capacity of the rotary disc filter.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A rotary disc filter having a filter media cleaning system operable in a first mode for backwash cleaning the filter media and in a second mode for chemically cleaning the filter media, the rotary disc filter comprising:
   a drum including an inlet opening for enabling influent water to flow into the drum;
   a series of rotary filter discs mounted on the drum;
   filter media positioned on opposite sides of the disc;
   the drum including openings in the surface thereof for enabling influent water to flow by gravity from the drum into the disc where the influent water accumulates therein and moves from the interior of the disc outwardly through the filter media to produce filtered water;
   an integrated filter media cleaning system operable in the first mode to backwash the filter media by directing the backwash onto the filter media and operable in the second mode to chemically clean the filter media;
   the integrated filter media cleaning system including a control valve, a backwash supply line leading from the control valve to one or more nozzles, an eductor operatively interconnected between the control valve and the one or more nozzles and further operatively connected to a chemical reservoir through a chemical feed line;
   characterized by comprising:
   a single pump operative in the first mode to pump a backwash through the control valve and through the backwash supply line to the one or more nozzles, and further operative in the second mode to pump the backwash through the control valve into the eductor which mixes the backwash with a chemical from the chemical reservoir to form a backwash-chemical mixture and wherein the pump is operative to pump the backwash-chemical mixture to the one or more nozzles;
   a controller for controlling the cleaning system and causing the cleaning system to operate in the first mode under certain conditions and to operate in the second mode under other conditions by implementing the following functions:
   i. execute backwash cleaning of the filter media according to the established protocol for backwash cleaning of the filter media while the rotary disc filter is conducting filtration of the influent water;
   ii. receiving variable process data for a selected period of time;
   iii. on an ongoing basis, evaluating the received variable process data;
   iv. comparing the evaluated variable process data with model process information;
   v. based on the differences between the evaluated variable process data and the model process information, determining whether to cause the cleaning system to chemically clean the filter media; and
   vi. if the difference between the evaluated variable process data and the model process information calls for implementing chemical cleaning of the filter media, then while the rotary disc filter is filtering influent water instituting chemical cleaning of the filter media of the rotary disc filter.

2. The rotary disc filter of claim 1 wherein the controller functions to quantify the difference between the evaluated variable process data and the model process information, and if the difference is greater than a threshold, then the controller is operative to cause the cleaning system to chemically clean the filter media.

3. The rotary disc filter of claim 1 wherein the controller functions to suspend backwash cleaning of the filter media while the cleaning system operates to chemically clean the filter media.

4. The rotary disc filter of claim 1 wherein prior to instituting chemical cleaning of the filter media, the controller institutes backwash cleaning of the filter media.

5. The rotary disc filter of claim 1 wherein the controller controls the cleaning system such that when the cleaning system is operated to chemically clean the filter media, only a portion of the filter media is chemically cleaned at one time; and wherein the controller further functions to rotate the disc such that a different portion of the filter media can be chemically cleaned.

6. The rotary disc filter of claim 1 wherein the controller receives and evaluates variable process data while chemically cleaning the filter media, and wherein in response to the variable process data indicating a need for backwash cleaning of the filter media, the controller functions to suspend chemical cleaning and causes the cleaning system to perform backwash cleaning of the filter media.

7. The rotary disc filter of claim 1 wherein the variable process data received by the controller includes solids loading and backwashing runtimes.

8. The rotary disc filter of claim 7 wherein the model process information includes information correlating solids loading with recommended backwash runs.

9. The rotary disc filter of claim 1 wherein the controller functions to initiate chemical cleaning of the filter media if backwash runtimes for the solids loading being experienced by the disc filter is below a threshold requirement suggested by the model process information.

10. The rotary disc filter of claim 1 wherein the controller controls chemical cleaning of the filter media such that chemical cleaning occurs between backwash cycles, and wherein the backwash cycles may occur at programmed times or result from a variable process based program.

11. The rotary disc filter of claim 1 wherein during chemical cleaning if the controller determines that process conditions requires backwash cleaning, the controller is configured to (1) recognize what portions of the filter media have been chemically cleaned, (2) suspend the chemical cleaning activity while backwash cleaning is performed, and (3) resume chemical cleaning activity for unclean portions of the filter media once the backwash cleaning is complete.

12. The rotary disc filter of claim 1 including two sets of spray nozzles wherein one set includes at least one nozzle operatively connected to the backwash supply line for spraying a backwash on the filter media, the other set including at least one nozzle operatively connected to a chemical supply line for spraying the backwash-chemical mixture onto the filter media.

13. The rotary disc filter of claim 1 wherein the controller controls the amount of chemical induced into the eductor and mixed with the backwash.

14. The rotary disc filter of claim 1 wherein the controller during chemical cleaning is operative to cycle the pump on and off and to rotate the disc in intervals and to provide for a rest period to allow the chemical to contact the filter media.

15. The rotary disc filter of claim 1 wherein the integrated filter media cleaning system comprises two separate sets of nozzles, a first set of nozzles and second of set of nozzles; and wherein the backwash supply line is operatively connected to the first set of nozzles and wherein there is provided a backwash-chemical mixture supply line that leads from the eductor to the second set of nozzles.

16. A rotary disc filter having a filter media cleaning system operable in a first mode for backwash cleaning the filter media and in a second mode for chemically cleaning the filter media, the rotary disc filter comprising:
   a drum including an inlet opening for enabling influent water to flow into the drum;
   a series of rotary filter discs mounted on the drum;
   filter media positioned on opposite sides of the disc;
   the drum including openings in the surface thereof for enabling influent water to flow by gravity from the drum into the disc where the influent water accumulates therein and moves from the interior of the disc outwardly through the filter media to produce filtered water;
   an integrated filter media cleaning system operable in the first mode to backwash the filter media by directing the backwash onto the filter media and operable in the second mode to chemically clean the filter media;
   the integrated filter media cleaning system including a control valve, one or more nozzles, and a chemical reservoir for holding a chemical used in chemically cleaning the filter media;
   a single pump operative in the first mode to pump a backwash through the control valve to the one or more nozzles and further operative in a second mode to mix the backwash with the chemical from the chemical reservoir to form a backwash-chemical mixture and to pump the backwash-chemical mixture to the one or more nozzles; and
   a controller for controlling the cleaning system and causing the cleaning system to operate in the first mode under certain conditions and to operate in the second mode under other conditions by implementing the following functions:
   i. execute backwash cleaning of the filter media according to the established protocol for backwash cleaning of the filter media while the rotary disc filter is conducting filtration of the influent water;
   ii. receiving variable process data for a selected period of time;
   iii. on an ongoing basis, evaluating the received variable process data;
   iv. comparing the evaluated variable process data with model process information;
   v. based on the differences between the evaluated variable process data and the model process information, determining whether to cause the cleaning system to chemically clean the filter media; and
   vi. if the difference between the evaluated variable process data and the model process information calls for implementing chemical cleaning of the filter media, then while the rotary disc filter is filtering influent water instituting chemical cleaning of the filter media of the rotary disc filter.

17. The rotary disc filter of claim 16 wherein the controller functions to quantify the difference between the evaluated variable process data and the model process information, and if the difference is greater than a threshold, then the controller is operative to cause the cleaning system to chemically clean the filter media.

18. The rotary disc filter of claim 16 wherein the controller controls the cleaning system such that when the cleaning system is operated to chemically clean the filter media, only a portion of the filter media is chemically cleaned at one time; and wherein the controller further functions to rotate the disc such that a different portion of the filter media can be chemically cleaned.

19. The rotary disc filter of claim 16 wherein the controller receives and evaluates variable process data while chemically cleaning the filter media, and wherein in response to the variable process data indicating a need for backwash cleaning of the filter media, the controller functions to suspend chemical cleaning and causes the cleaning system to perform backwash cleaning of the filter media.

20. The rotary disc filter of claim 16 wherein during chemical cleaning if the controller determines that process conditions requires backwash cleaning, the controller is configured to (1) recognize what portions of the filter media have been chemically cleaned, (2) suspend the chemical cleaning activity while backwash cleaning is performed, and (3) resume chemical cleaning activity for unclean portions of the filter media once the backwash cleaning is complete.

* * * * *